United States Patent
Nagatomo et al.

(10) Patent No.: US 8,651,962 B2
(45) Date of Patent: Feb. 18, 2014

(54) AMUSEMENT SYSTEM HAVING COMMUNICATION FUNCTION

(75) Inventors: Yasuyuki Nagatomo, Minato-ku (JP);
Kenichi Yamamoto, Minato-ku (JP);
Yoshihiko Aramaki, Minato-ku (JP);
Takuto Kaji, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/813,381

(22) PCT Filed: Jul. 6, 2012

(86) PCT No.: PCT/JP2012/067355
§ 371 (c)(1),
(2), (4) Date: Jan. 30, 2013

(87) PCT Pub. No.: WO2013/011849
PCT Pub. Date: Jan. 24, 2013

(65) Prior Publication Data
US 2013/0203500 A1 Aug. 8, 2013

(30) Foreign Application Priority Data
Jul. 19, 2011 (JP) .................................. 2011-157884

(51) Int. Cl.
*G06F 17/00* (2006.01)
(52) U.S. Cl.
USPC .......................................................... 463/42
(58) Field of Classification Search
USPC ......................................... 463/16–25, 40–42
See application file for complete search history.

(56) References Cited

U.S. PATENT DOCUMENTS

| 7,806,768 | B2 * | 10/2010 | Kobayashi et al. | 463/43 |
| 7,831,660 | B2 * | 11/2010 | Park | 709/203 |
| 8,007,363 | B2 * | 8/2011 | Jonishi | 463/42 |
| 2002/0129112 | A1 | 9/2002 | Maehiro | |
| 2005/0209008 | A1 | 9/2005 | Shimizu et al. | |
| 2012/0150997 | A1 * | 6/2012 | McClements, IV | 709/217 |

FOREIGN PATENT DOCUMENTS

| JP | 2002-259313 A | 9/2002 |
| JP | 3934649 B2 | 6/2007 |
| JP | 2007-275246 A | 10/2007 |
| JP | 2010-131082 A | 6/2010 |
| JP | 2011-005306 A2 | 1/2011 |

OTHER PUBLICATIONS

International Search Report (Date of Mailing Sep. 11, 2012).
Japanese Office Action with English Translation (Dispatch Date Sep. 11, 2012).
Chinese Office Action with English Translation—Issued Jul. 22, 2013.

* cited by examiner

*Primary Examiner* — Ronald Laneau
(74) *Attorney, Agent, or Firm* — Howard & Howard Attorneys PLLC

(57) ABSTRACT

A game machine (2) receives via a server apparatus (3) and displays on a game image (110), a comment transmitted from a terminal apparatus (7) of a user. When a user of the game machine (2) indicates a reply to the comment, the game machine (2) requests the server apparatus (2) to transmit as a reply comment, a comment for reply which is specified in advance by the user, to a user who is a transmitter of the comment to be replied. By following the request, the server apparatus (3) transmits the comment for reply to the terminal apparatus (7) of the user who is a destination of reply.

14 Claims, 12 Drawing Sheets

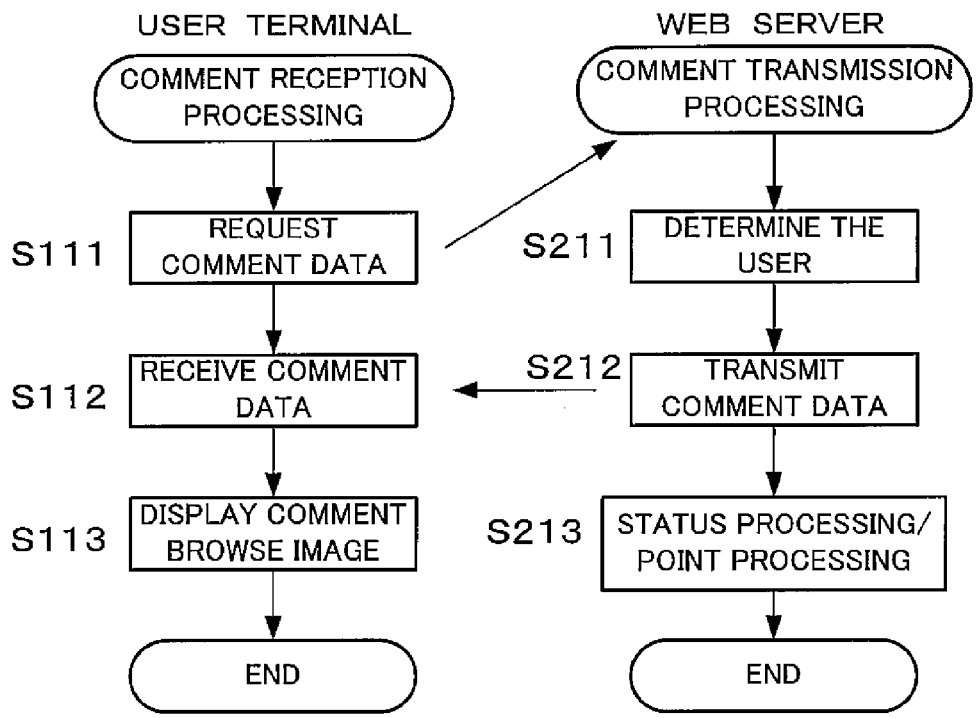
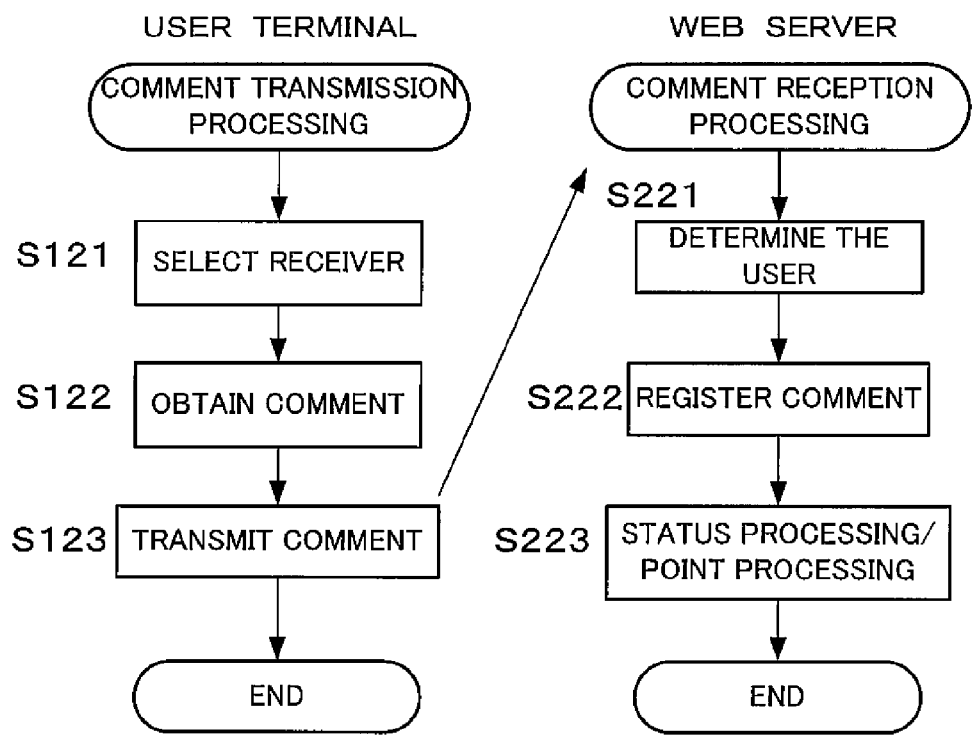

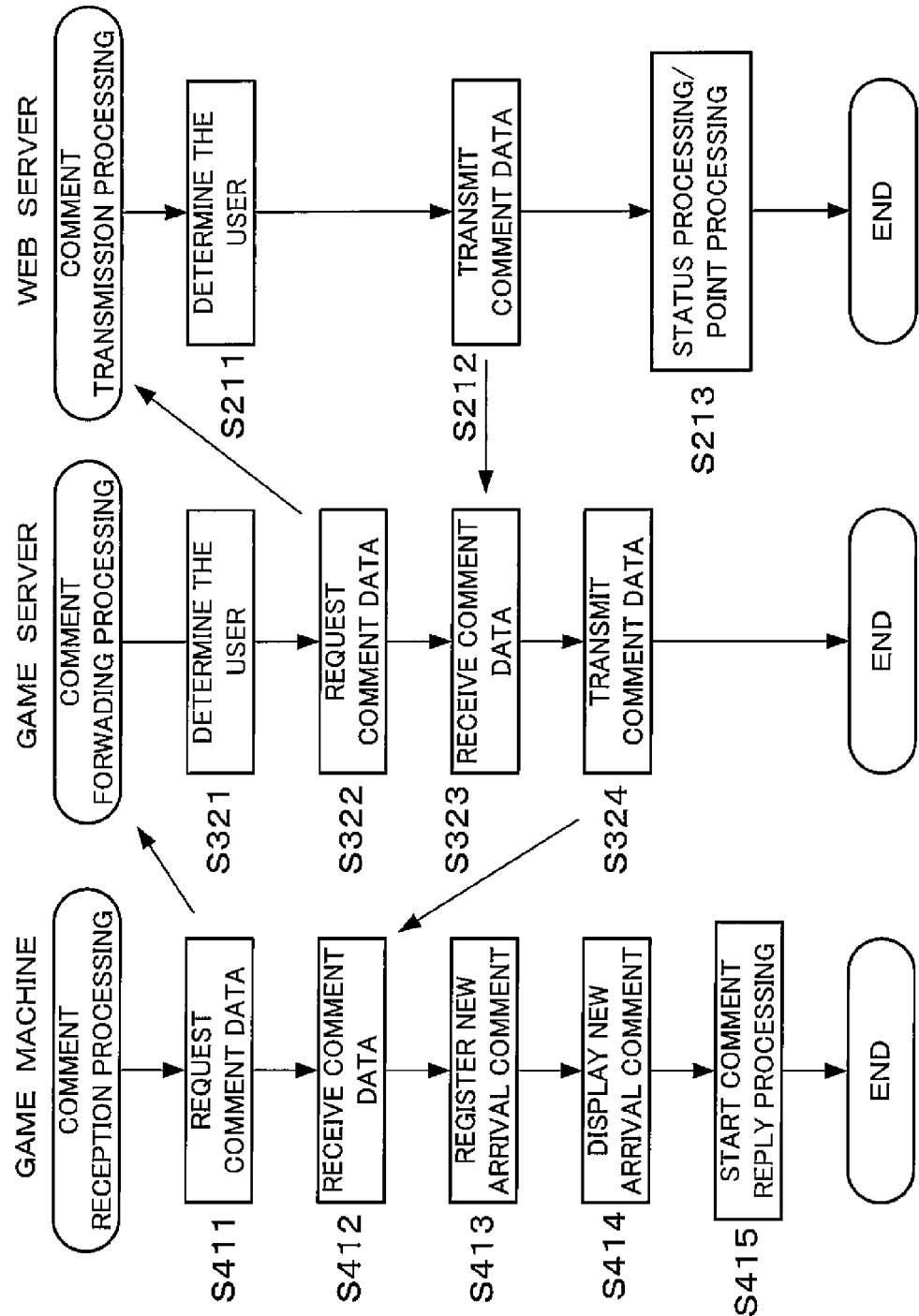

AMUSEMENT SYSTEM HAVING COMMUNICATION FUNCTION

CROSS REFERENCE TO RELATED APPLICATION

This application is a national stage application of PCT/JP2012/067355, filed Jul. 6, 2012, which claims priority to Japanese Patent Application No. 2011-157884, filed Jul. 19, 2011, the disclosures of which are hereby incorporated by reference in their entirety.

TECHNICAL FIELD

The present invention relates to an amusement system in which users can communicates between a game machine for commercial use and a personal terminal apparatus.

BACKGROUND ART

As a structure which realizes communication between users via a network, in resent years a network service represented by the SNS (the abbreviation of the social network service) has prevailed. The field of amusement system is not an exception. For example, there is proposed an amusement system enabling to exchange messages or the like between game machines for home use which are connected to a network (e.g. see the patent literature 1). There is also proposed a system where pseudo communication is realized by transmitting and receiving selectively dialogue appropriate to a game state (e.g. see the patent literature 2).
Patent Literature 1: JP-A-2011-005306 and 2: JP-A-2010-131082.

SUMMARY OF INVENTION

Technical Problem

However, in a case of the conventional system, communication is allowed only within a limited range such as between personal communication terminal apparatuses like personal computers and portable terminals (including portable game machines), or between game machines for commercial use. However, there is no system where communication between users is realized beyond the range. As communication means between communication terminals, provided are various kinds of means such as the e-mail, the blog, and the SNS, and they has evolved from day to day from the aspect of usability. However, the communication function targeting the game machine for commercial use is staying as a simple one such as the pseudo communication mentioned above. The reasons of this are the following: as the game machine for commercial use charges on a game-play, it is required that the game-play frequency is increased and it is not preferable that the user spends his/her time communicating and the game-play frequency descends; as the user is busy for playing the game, he/she cannot afford to input strings and the like.

Then, the aim of the present invention is providing an amusement system which enables communication between the game machine and the personal terminal apparatus in consideration of conditions unique to the game machine for commercial use.

Solution to Problem

The present invention 1 is an amusement system including a game machine for commercial use configured to allow a user to play a game in exchange of payment of game-play fee by the user, a personal terminal apparatus configured to allow a user to input given strings and a server apparatus configured to provide a predetermined service associated with the game to the game machine, and the terminal apparatus, the game machine, the terminal apparatus and the server apparatus communicating with each other via a network with specifying the other side of communication, the server apparatus configured to specify a user of each of the game machine and the terminal apparatus by exchanging information necessary for specifying the user with each of the terminal apparatus and the game machine, wherein the server apparatus is connected to a storage device for server storing comment data for each user, where a comment which the user transmitted with specifying another user as a receiver is registered with information necessary for specifying the user as a transmitter of the comment, the terminal apparatus has: a comment transmission device adapted and configured to transmit a comment inputted by a user of the terminal apparatus to the server apparatus with information necessary for specifying a user as a receiver of the comment; and a comment reception device adapted and configured to receive from the server apparatus and present to the user of the terminal apparatus, the comment in the comment data registered in the storage device for server in association with the user of the terminal apparatus, the server apparatus has: a comment data registration device adapted and configured to specify the user as the receiver of the comment transmitted from the terminal apparatus, and register the comment in the comment data correlated to the user as the receiver with information necessary for specifying the user as the transmitter; and a comment distribution device adapted and configured to transmit the comment to be transmitted to the user as the receiver within comments registered in the comment data, to the terminal apparatus of the user as the receiver of the comment with the information necessary for specifying the transmitter of the comment, the storage device for server having a comment for reply set by a user in advance in association with information necessary for specifying the user, the comment distribution device of the server apparatus adapted and configured to, in a case that a user accesses the server apparatus from the game machine, transmit the comment to be transmitted to the user within the comments registered in the comment data in association with the user, to the game machine of the user with the information necessary for specifying the transmitter of the comment, the game machine has: a comment reception device adapted and configured to receive and present to the user, the comment transmitted from the server apparatus, the receiver of which is the user of the game machine; and a reply request device adapted and configured to, based on an instruction by the user, request the server apparatus, with indicating as a receiver the transmitter of the comment presented at the game machine, to transmit as a reply comment, a comment for reply correlated to the user of the game machine to the user as the receiver, and the comment data registration device of the server apparatus adapted and configured to, by following a reply request from the game machine, register the comment for reply in the comment data correlated to the user as the receiver so as to set the transmitter of the comment is the user of the game machine.

According to the present invention, when a user transmits a comment from the terminal apparatus, the comment is registered in the comment data of a user as a receiver, by the comment data registration device of the server apparatus. The comment distribution device of the server device distributes the comment with information necessary for specifying a user as a transmitter to the terminal apparatus of the user as the receiver, the comment being determined to be transmitted to the user as the receiver within comments registered in the comment data. The terminal apparatus of the user as the receiver receives and presents to the user the comment transmitted from the server apparatus. Thereby, it is possible to exchange a comment between users of terminal apparatuses to have a communication. In addition, when a user accesses the server apparatus from the game machine, the comment distribution device of the server apparatus transmits the comment which should be transmitted to a user, to the game machine with the information necessary for specifying the user as the transmitter, and the game machine receives and presents to the user the comment. Thereby, it is possible for a user to confirm the comment which should be transmitted to the user even at the game machine. Then, when the user indicates a reply to the comment at the game machine, the game machine transmits a request to the server apparatus for transmitting as a reply comment, a comment for reply set by the user in advance. The server apparatus which has received this request, by following this request, registers the comment for reply set in advance in the comment data correlated to a user who should receive the reply. The user who should receive the reply can receive the comment at the terminal apparatus and confirm the content of the comment. Thereby, it is possible to realize a communication of users even between the game machine and the terminal apparatus. In addition, it is possible to transmit, by following the indication from a user of the game machine, a comment for reply set by the user in advance to the terminal apparatus of a user who should receive the comment. Accordingly, even when a user cannot afford to input given strings like a moment when the user is playing the game, the user can have a communication in a comparatively easy manner. As the operation necessary for replying a comment from the game machine completes for comparatively short time, it is possible to reduce or remove the effect on the game-play frequency of the game machine.

In the present invention, "the game machine for commercial use" means a game machine which is configured on the premise that all or a part of hardware and software are transferred or leased to an operator, and the operator allows the user to use the hardware and software with charge. On the other hand, the terminal apparatus for personal use is a terminal apparatus which is transferred or leased to the user mainly on the premise of personal use, and it does not matter whichever with charge or without charge, the terminal apparatus is transferred or leased, and it does not matter whatever the terminal apparatus is referred to as, as long as the terminal apparatus is capable of inputting given strings and connecting to a network. Various kinds of information-communication terminal apparatuses for personal use, such as a personal computer, a game machine for home use, and a portable phone (including a so-called smart phone), can be applied to the terminal apparatus for personal use of the present invention. The term "comment" of the present invention is anything the content of which can be recognized or understood visually by the user. The comment is not limited to an example which is constituted by only letters, but also a figural element like a pictogram and a symbol may constitute at least a part of the comment. Also, the term "strings" is not limited to an example which is constituted by only letters, but also a figural element like a pictogram and a symbol may constitute at least a part of the strings. The way of payment for game-play of the game machine can be realized by various kinds of embodiments, as long as the user gives an operator of the game machine some economic value, such as cash, virtual current money, credit card, and the like. Indicating the other side of communication in a network means that each of the server apparatus, the terminal apparatus, and the game machine specifies a place in the network of an equipment of the other side who should be contacted on the network. On the other hand, specifying a user means that the user using the terminal apparatus and/or the game machine is specified unambiguously by using an ID and/or the other identification information.

In the present invention, the comment distribution device of the server apparatus may be configured as a push-based distribution device which transmits, each time a new comment is registered in the comment data, the comment to the terminal apparatus of the user, and may be configured as a pull-based distribution device which transmits a comment in response to a request of the user from the terminal apparatus. The comment distribution device may be configured so as to use selectively the push-based distribution and the pull-based distribution depending on the access status or the like. When receiving a comment, the comment data registration device not only registers the comment in the comment data corresponding to the user indicated as the receiver of the comment, but also may specify the user as the transmitter of the comment and register the comment in the comment data correlated to the user. Namely, the comment data can be designed in such a way that each time communicated between users, the comment may be registered in the comment data, like the Web mail, the blog, and the SNS. In this case, a comment which a user is indicated as a receiver of, can be registered as a received comment in the comment data of the storage device for server apparatus, and a comment which each user is indicated as a transmitter of, can be registered as a transmitted comment. Thereby, when the comment is transmitted from the server apparatus to the terminal apparatus, each user can confirm the transmitted comment from himself/herself and the received comment at the terminal apparatus. However, in a case that the transmitted comment is held at the terminal apparatus, even if only the received comment is registered in the comment data, the user can confirm both of the transmitted comment and the received comment at the terminal apparatus.

As one embodiment of the present invention, the terminal apparatus may be provided with a comment for reply registration request device which is adapted and configured to transmit to the server apparatus, a request for registering strings indicated by the user as the comment for reply, and the server apparatus may be provided with a comment for reply registration device which is adapted and configured to register in the storage device for server the strings indicated by the user as the comment for reply which should be correlated to the user, by following the request for registering the comment for reply from the terminal apparatus. According to this embodiment, the user himself/herself can indicate the comment for reply. Thereby, it is possible to realize a communication consistent with user's intention.

In the above embodiment, the comment for reply registration request device of the terminal apparatus may be adapted and configured to request the server apparatus to register the strings inputted as the comment for reply at the terminal apparatus by the user, as the comment for reply corresponding to the user, and the comment for reply registration device of the server apparatus may be adapted and engaged to register in the storage device for server, the strings inputted by the user at the terminal apparatus as the comment for reply, as the comment for reply which should be correlated to the user. In this case, the user can input given strings from the terminal apparatus in advance to register the strings as the comment for reply. Thereby, it is possible to realize a communication more consistent with user's intention.

As one embodiment of the present invention, the server apparatus may be provided with a comment for reply transmission device which is adapted and configured to transmit to the game machine when a user uses the game machine, the comment for reply registered in association with the user, and the game machine may be provided with a comment for reply registration device which is adapted and configured to register the comment for reply transmitted from the server apparatus during a duration the game machine is used by the user, and the replay request device of the game machine may be adapted and engaged to transmit to the server apparatus the comment for reply registered by the comment for reply registration device, when requesting the server apparatus to transmit the reply comment to the user as the receiver.

According to the above embodiment, when the comment for reply is read into the game machine, and the user replies from the game machine, the user can transmit the comment for reply held by the game machine. Accordingly, the server apparatus can treat the comment transmitted from the game machine in a similar procedure to the comment transmitted from the terminal apparatus. Therefore, it is possible to commonalize functions which should be mounted to the server apparatus.

As one embodiment of the present invention, a pieces control device may be further comprises, the pieces control device controlling the number of pieces of comments which can be presented to the user of the game machine, so that the number is within a fixed range from the latest comment. Thereby, it is possible to restrict the number of pieces of comments which can be confirmed at the game machine, to a range that there is no problem in the game-play of the game machine, or a range that there is no effect on game-play frequency of the game machine.

As one embodiment of the present invention, the storage device for server may store group information necessary for specifying a group of each user, the game machine may be provided with a news information transmission device which is adapted and engaged to transmit, when the user reaches a predetermined status in the game, news information for informing the server apparatus of the status, the server apparatus may be provided with a news information distribution device which is adapted and configured to, in a case that the news information is transmitted from the game machine, determine based on the group information, users who belong to the same group as the user who reached the predetermined status, and the terminal apparatus may be provided with a news information reception device which is adapted and configured to receive and present to the user the news information.

According to this embodiment, when the user reaches a predetermined status in a game at the game machine, the information is distributed as the news information to the other user within the group, and each user can confirm the news information at the terminal apparatus. Thereby, it is possible to commonalize information related to a game of users within the group. Accordingly, it is possible to raise the feeling that the users are linked to each other. Alternatively, it is possible to prompt users within the group to participate the game, by distributing information as the news information, such that a specific user within the group obtained a high score, and possible to enhance their interest in the game.

Further, the comment transmission device of the terminal apparatus may be adapted and configured to transmit to the server apparatus the strings inputted by the user in response to the news information presented, as a comment the receiver of which is the user who achieved the predetermined status. In this case, the user who saw the news information can reply his/her encouragement or celebration comment to the user who is the source of the new information. Thereby, it is possible to make the communication between users more activated or smooth.

Effects of Invention

As explained above, according to the amusement system of the present invention, the user can confirm a comment the receiver of which is the user, not only at the personal terminal apparatus but also at the game machine, and when the user indicates the reply to the comment at the game machine, the comment for reply which is set in advance by the user is transmitted as the reply comment. Thereby, it is possible to realize a communication of users between the game machine and the terminal apparatus. Accordingly, it is possible to raise the attractiveness of the amusement system. In addition, even when the user can not afford to input given strings like a moment of game-play, it is possible to have a communication in a comparatively easy way. Or, as the operation necessary for replying a comment from the game machine completes in a comparatively short time, it is possible to reduce or remove the effect to be given to the game-play frequency of the game machine.

BRIEF DESCRIPTION OF DRAWINGS

FIG. 8 is a flow chart showing procedure of processing implemented for receiving a comment at a user terminal;

FIG. 9 is a flow chart showing procedure of processing implemented for transmitting a comment at user terminal;

FIG. 10 is a flow chart showing procedure of processing implemented so that a user receives a comment at a game machine;

DESCRIPTION OF EMBODIMENTS

Figure 1:
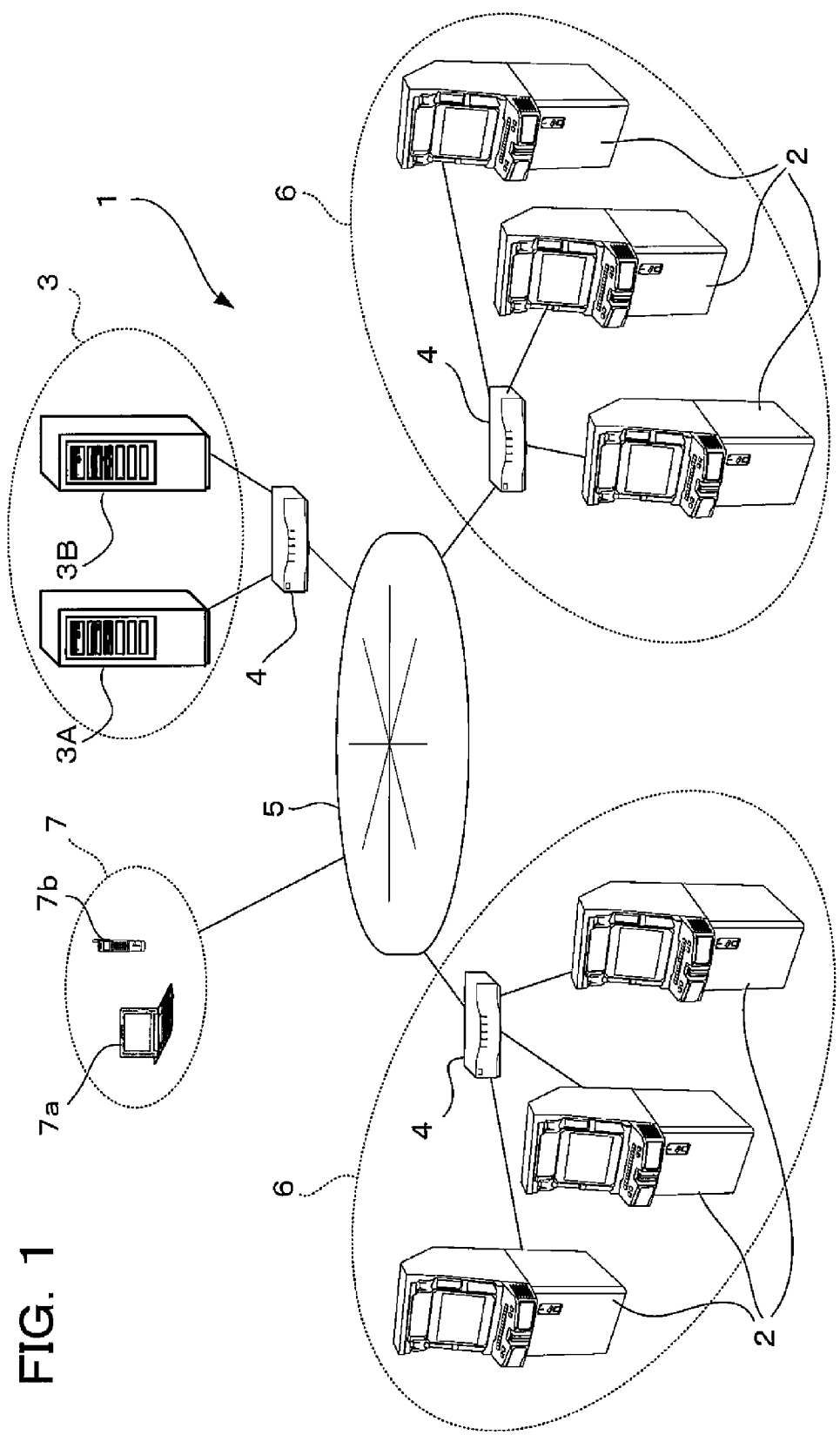
FIG. 1 is a diagram showing a whole configuration of an amusement system according to one embodiment of the present invention.

First, referring to FIG. 1, a whole configuration of amusement system according to one embodiment of the present invention will be described. In an amusement system 1, a plurality of game machines 2 and a server group 3 as a server apparatus are connected to network 5 via routers 4 respectively. The server group 3 includes a game server 3A and a web server 3B. The game server 3A and the web server 3B may be configured as physically independent computer apparatuses respectively, or may be configured logically as one physical computer apparatus. Alternatively, at least either one of the game server 3A and the web server 3B may be configured as one logical server 3A or 3B obtained by assembling plural physical computer apparatuses. As one example, the servers 3A, 3B may be configured by the so-called cloud computing.

The network 5 provides network communication using the TCP/IP protocol, and typically, the internet is used as the network 5. Each game machine 2 is configured as a game machine for commercial use (business use) which allows a user to play a predetermined range of game in exchange of payment of a predetermined value of game-play fee. The appropriate number of game machines are installed to each commercial facility such as a store 6. Each router 4 is installed in association with each store 6 and each server group 3. The game machines 2 in the same store share one router 4 and each connects to the network 5 via the router 4. A local server may be installed between the game machine 2 and the router 4 of the store 6, and the game machine 2 may be connected communicably to the server group 3 via the local server.

The server group 3 is installed by a controller of the amusement system 1, and provides various kinds of services via the network 5 to the game machine 2 or a user (a player) of the game machine 2. As one example, the game server 3A provides the following services: a service of updating a game program or data via the game machine 2; a service of verifying a user of the game machine 2, and storing player data with respect to the user, including game-play history, saved data, and the like. On the other hand, the web server 3B provides various kinds of web services to a user terminal 7 which accesses via the network 5. As the user terminal 7, any type of computer unit may be used, as long as the computer unit functions as a personal communication terminal apparatus capable of connecting to a network, like a personal computer (hereinafter, abbreviated as PC) 7a and a portable phone (including a smart phone) 7b.

Additionally, in the server group 3, a charge server is also included, which charges a fee as a counter value of providing pay service on a user who has accessed from the game machine 2 or the user terminal 7, and collects the fee in response to the operation by the user. However, the illustration of the charge server is omitted. The charge server collects fees by exchange of electronic information. For example, the service fee is collected by means of the withdrawal of virtual money, or the credit card transactions. A game-play fee of the game machine 2 may be charged and collected by the charge server.

To each of the game machines 2, the server 3A and the server 3B, an IP address unique for identifying each in the network 5 is given. In the communication between the game machines 2, or between the game machine and the server 3A or 3B, the other side of communication is specified by using the IP address. In a case that the network 5 has openness like the internet, a static address unique in the network 5 is given to each router 4. To the game machine 2, a private address is set as the IP address. Each game machine 2 is uniquely identified by a combination of the private address and the static address. In this case, a virtual private network (VPN) is configured between the game machine 2 and the server 3A, 3B, or between the game machines 2. In the VPN, each game machine 2 is uniquely specified by using the private address.

Also, to each user terminal 7, an IP address for uniquely identifying each user terminal 7 in the network 5 is given. The IP address may be whichever a so-called dynamic address which changes each time the user terminal 7 connects to the network 5, or a unchangeable static address. Hereinafter, information for identifying each game machine 2, the server 3A, the server 3B, and each user terminal 7 is referred to as address information. In the communication via the network 5, unless otherwise noted it is premised that the other side which should be connected to is specified based on the address information.

Figure 2:
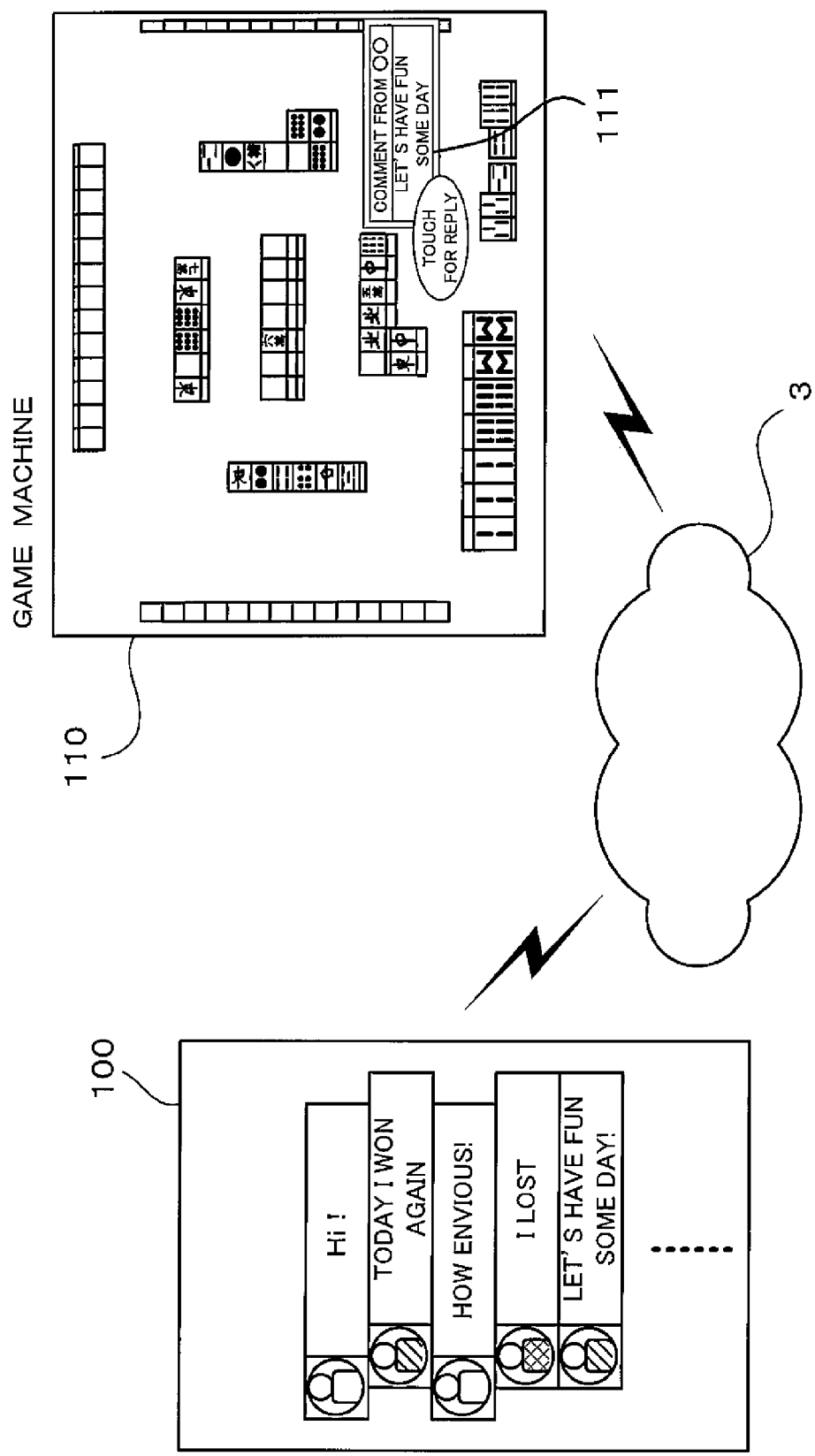
FIG. 2 is a diagram showing the outline of communication in the amusement system.

Next, referring to FIG. 2, the outline of communication implemented by the amusement system 1 will be described. This amusement system 1 enables users to enjoy a service such that the users can form a community in a network, the users belonging to the community share information through a community service provided by the server group 3, and comments (or can be referred to as messages) are exchanged with each other between the game machine 2 and the user terminal 7, or between the user terminals 7. Hereinafter, such service is collectively called as the community service. FIG. 2 shows a state of the comment exchange using the community service. A browse image 100 for comments is displayed on the user terminal 7. The browse image 100 is similar to a browse image used in a known communication service such as the SNS, the browse image showing comments which were transmitted and received by a user in the thread form. On the other hand, a comment window 111 is displayed on a game image 110 of the game machine 2, and in the comment window 111, a comment transmitted from the user terminal 7 is displayed. The game machine 2 has a touch panel which covers the game image 110 as an input device. When a user performs the touch operation to the window 111, a comment registered in advance is transmitted to a user who transmitted a initial comment. The window 111 is displayed as a pop-up window when the game machine 2 receives a comment. In FIG. 2, though the game image 110 showing a state that a mahjong game is ongoing is displayed as an example, it is possible to select a game to be implemented at the game machine 2 appropriately depending on the situation.

Figure 3:
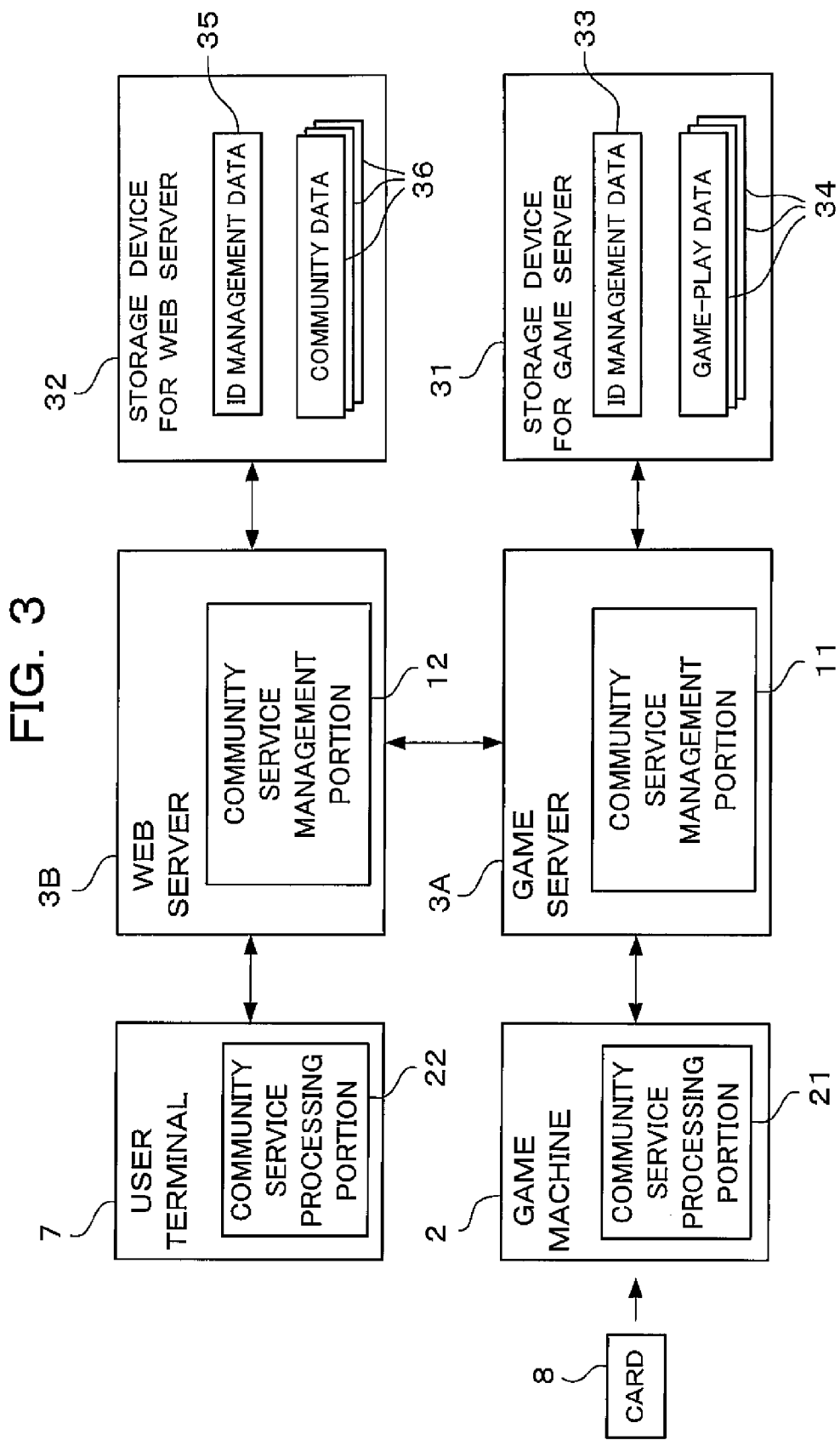
FIG. 3 is a function block diagram of a major part of the amusement system.

FIG. 3 is a function block diagram of amusement system mainly showing a part relating to realization of the community service. The game server 3A and the web server 3B of the amusement system 1 are provided with community service management portions 11, 12 for providing the community service respectively. Each of the community service management portions 11, 12 is a logical device realized by the combination of a computer unit constituting the server group 3 and software. The game machine 2 and the user terminal 7 are provided with the community service processing portions 21, 22 for realizing the community service in cooperation with the community service management portions 11, 12 respectively. Each of the community service processing portions 21, 22 is a logical device realized by the combination of a computer unit constituting the game machine 2 and the user terminal 7 and software. The community service management portion 12 of the web server 3B and the community service processing portion 22 of the user terminal 7 provide various kinds of services to be provided in a known communication service like the SNS, such as information sharing between users, comment exchange, making fellow, and those functions can be realized by using software mounted to the web server and the user terminal in the known communication service respectively. However, the function of the fellow news which will be described later is a function unique to amusement system 1, and thereby, in order to realize the function, addition or change to known software is required.

The game server 3A and the web server 3B are provided with storage devices 31, 32 respectively. In the storage device 31 of the game server 3A, ID management data 33 and a group of game-play data 34 are registered. In the storage device 32 of the web server 3B, ID management data 35 and a group of community data 36 are registered. The ID management data 33, 35 is data for managing the correlation between various kinds of IDs set as information necessary for specifying a user. The kind of IDs and the way of management of IDs may be determined appropriately depending on the situation as long as the IDs enable to specify each user. The following is one example. First, the game machine 2 specifies the user by using a card 8. In the card 8, a card ID unique for each card is registered. The game machine 2 has a function of reading out and transmitting to the game server 3A, the card ID registered in the card 8. On the other hand, the game server 3A specifies the user by using a user ID uniquely given to each user. In the ID management data 33, the correlation between the card ID and the user ID is registered. The game server 3A specifies the user ID corresponding to the card ID transmitted from the game machine 2 based on the ID management data 33.

Also, though the web server 3B manages users by using the user ID, the web server 3B manages, with respect to the community service, users by correlating each user to a community ID issued independently of the user ID. In the ID management data 35, the correlation between the community ID and the user ID is registered. The web server 3B can specify, by referring to the ID management data 35, the user ID correlated to the community ID, or the community ID correlated to the user ID. In this way, by referring to the ID management data 33, 35, it is possible to specify the correlation between all kinds of IDs. In addition, it is possible to set newly or change the correlation between the card ID and the user ID, and the correlation between the user ID and the community ID, by accessing a user management site of the web server 3B from the user terminal 7. Further different kind of ID may intervene between these IDs. Although one user ID is issued to one user, more than one card ID and/or more than one community ID may be issued to one user. In this case, by making a user specify one effective card ID and one effective community ID to his/her user ID, it is possible to maintain the correlation that, when any one of the card ID, the user ID and the community ID is determined, the other IDs can be unambiguously specified. In the following explanation, it is assumed that each of one card ID and one community ID are correlated to one user ID. It is possible to set user's nickname to each of the user ID and the community ID. In the ID management data 33, 35, the nicknames correlated to the IDs are also registered respectively. To the user ID, personal information such as user's name and address is further correlated.

Figure 4:
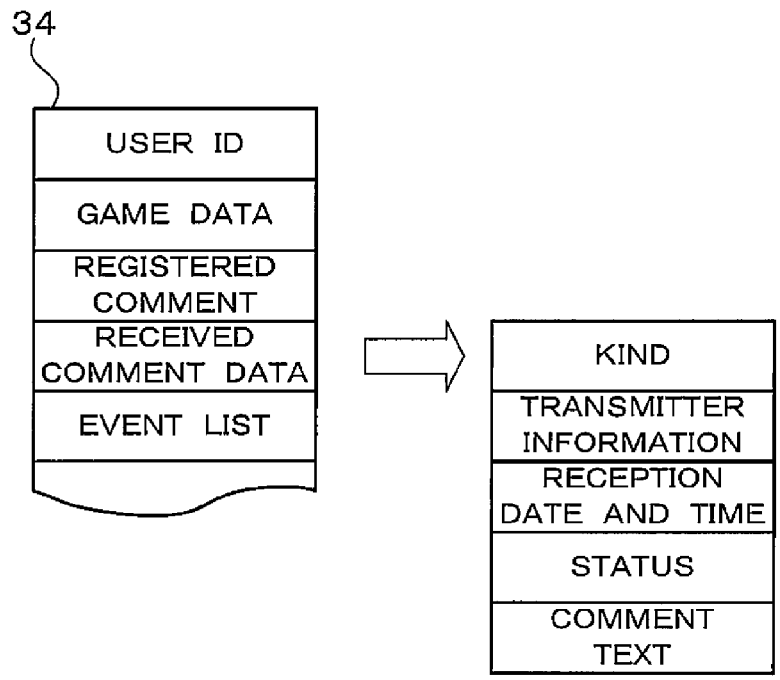
FIG. 4 is a diagram showing one example of data construction of game-play data.
Figure 5:
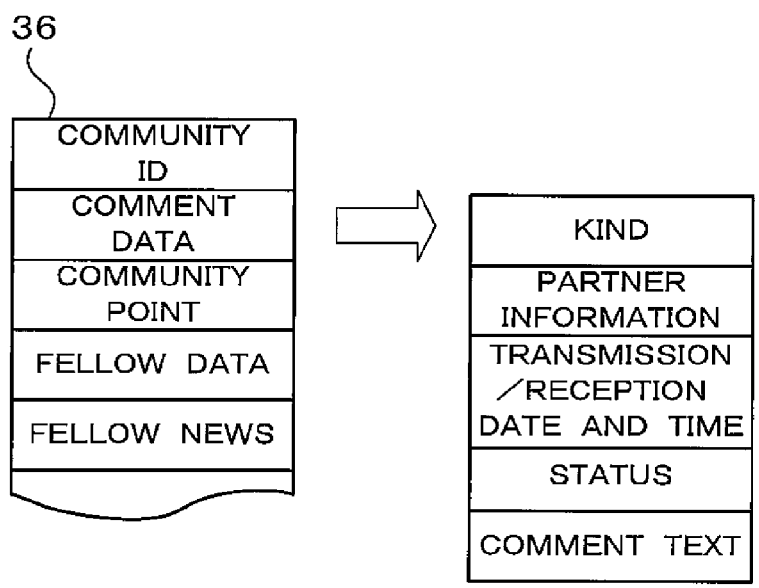
FIG. 5 is a diagram showing one example of data construction of community data.

The game-play data 34 is data where registered is various kinds of information to be referred to when a user plays a game at the game machine 2. The community data 36 is data where registered is various kinds of information to be referred to when a user uses the community service. The one example of outline structures of data 34, 35 are shown in FIGS. 4 and 5 respectively. As shown in FIG. 4, the game-play data 34 is data generated for each user ID. The game-play data 34 has a structure where some information with respect to the objective user, such as game data, a registered comment, received comment data and an event list, is registered in association with the user ID of the objective user. The game data is data where registered is various kinds of information related to game-play, such as save data of a game played by the user at the game machine 2, the number of times the user played the game, a score, evaluation, and obtained points. The registered comment is data where registered are some strings which the user should transmit as his/her comment from the game machine 2 to the other user. At least one set of strings can be registered as the registered comment. Plural pieces of registered comments may be registered. The data size of one registered comment may be limited.

The received comment data is data where registered is a comment the user received from the other user. The number of received comments registered is limited within a fixed range from the latest one. For example, in a case that it is allowed that 10 pieces of received comments are registered and 11 pieces or more of received comments exist, the eleventh or older comments are deleted from the received comment data. The received comment data includes, for each comment, the kind of the comment, user information (the community ID and the nickname) of a transmitter of the comment, reception date and time of the comment, status of the comment, and a comment text. The kind of comment includes information for discriminating the content of the comment. For example, information for discriminating which kind "encouragement", "celebration", or "return" each comment belongs to, is given to the kind of comment. The status of the comment indicates whether the received comment is in a read status or not, and the received comment is in a replied status or not. The comment text is text data of the comment.

The event list is data which is registered automatically when a user experiences an event predetermined in a game of the game machine 2, in other words, when a user reaches a predetermined status in the game. For example, when a user wins with the yakuman in a mahjong game, this event is registered in the event list. In the event list, occurrence date and time of the event and the text data stating the content of event are registered in association with each other. The text data is set by predetermined strings for each event.

As shown in FIG. 5, the community data 36 is generated for each community ID, and has a structure where information with respect to the objective user, such as his/her comment data, his/her community point, comment data, fellow data, and fellow news, is registered in association with the community ID of the objective user. The comment data is data where recoded is a comment transmitted by a user to another user and a comment received from another user. The comment data is different from the received comment data in the game-play data 34 shown in FIG. 4 in the structure thereof. Namely, the comment data in the community data 36 includes for each comment, the kind of comment, user information (including the community ID and his/her nickname) of the other side of comment, that is, the user information of the transmitter or the receiver, transmission/reception date and time, the status, and the comment text. The kind of comment includes information for discriminating whether the user received the comment (the received comment), or the user transmitted the comment (the transmitted comment), and further, to the kind of comment, given is the mentioned information for discriminating the content of comment. The status is information indicating whether the received comment is in a read status (has been read by the user) or not, and whether the received comment is in a replied status or not. The comment text is text data of the comment.

The number of registered pieces of comment data is limited depending on the situation. However, the upper limited value thereof is set so as to be much bigger than the upper limited value of received comment data of the player data 34. As the game machine 2 requires at least that the comment is displayed during a limited time in ongoing game-play, even if the number of registered pieces or the like of received comment data is set small, that's no problem. On the other hand, at the user terminal 7 for personal use, as the user can browse the comment at any time, it is required that the received comment and the transmitted comment are stored back for a certain term in order for a user to browse the comments. Accordingly, the upper limited value of the number of registered pieces of comment data of the community data 36 is set pretty big like the case of general community service. The number of registered pieces may be limited by the number, or may be limited by limiting registerable data size.

The community point is the point which is given to the user as privilege depending on the use degree of the community service. For example, when using a pay-service of the web server 3B, the user can use the points as a part of the fee, or the user can consume the points for receiving some privilege in a game provided by the game machine 2. In the amusement system 1, when a user transmits or receives a comment by using a community function, the community point is given to the user. Some limitation may be set such that the point is given only once a day.

In the fellow data, the community IDs of the other users and his/her nickname is registered, the other users being registered by the user as the fellow of the user. The registration of fellow is done by using an invitation or application similarly to a general community service. The details of procedure of fellow registration are omitted. The fellow news is data obtained by copying text data of event newly registered within the event list of a user who is registered in the fellow data. The registration of fellow news may be implemented whichever at the moment of updating the event list at the game machine 2 as a trigger, or automatically by the server group 3 by following a predetermined schedule.

A user can download the community data 36 corresponding to his/her community ID to the user terminal 7 any time, by invoking a program necessary for receiving the community service at the user terminal 7, inputting his/her user ID or the community ID correlated to the user ID, and logging in to the web server 3B. However, with respect to the comment data, only pieces of the comment data included in a predetermined range from the latest one are downloaded. If the user requests to download further older comment data, the comment data included in the next range may be allowed to be downloaded. Some logical devices for realizing various kinds of services are provided in the game server 3A and the web server 3B, as well as the above mentioned devices, and various kinds of information are also stored in the storage devices 31, 32 of those logical devices. However, the illustrations of those devices and data are omitted.

Next, various kinds of processing to be implemented in the amusement system 1 will be described, mainly with respect to the part relating to the realization of communication between users. The communication function between users is realized in cooperation with mainly the community service management portion 11 of the game server 3A, the community service management portion 12 of the web server 3B, and the community service processing portions 21, 22 of the game machine 2 and the user terminal 7. However, hereinafter, for making explanation concise, a stuff which implements something is sometimes represented as the server 3A, 3B, the game machine 2 or the user terminal 7.

Figure 6:
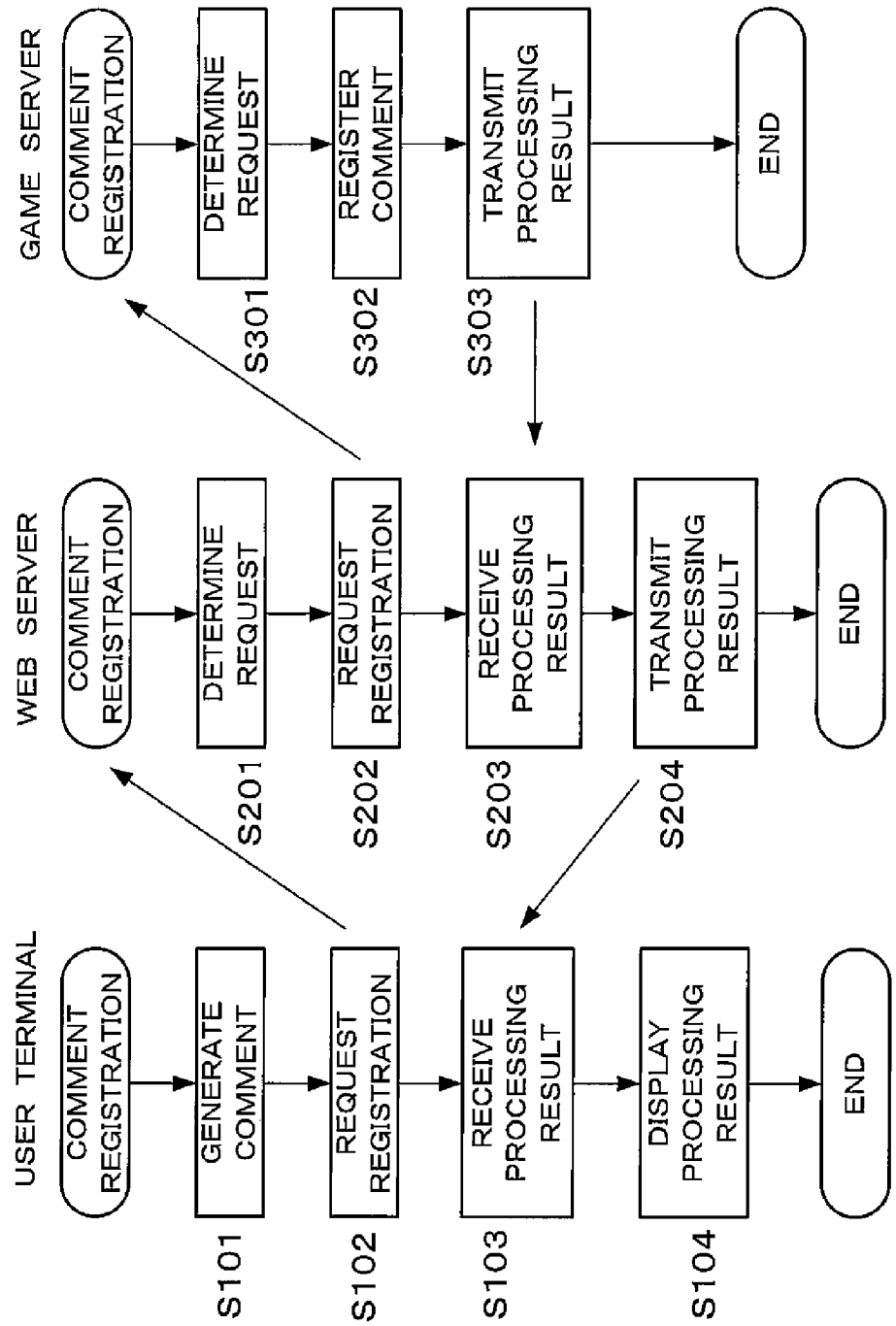
FIG. 6 is a flow chart showing procedure of processes implemented for registering a comment for reply in the game-play data.

FIG. 6 shows processing implemented for registering a comment for reply (the registered comment) from the game machine 2. The registration of a comment is started by taking it as a trigger that the user indicates to start the comment registration processing. Upon this indication, the user terminal 7 displays a predetermined comment generation image, and accepts the generation (the input) of comment by the user (step S101). Here, the comment can be generated by whichever way that the user inputs given strings with the function of inputting strings of the user terminal 7, or the user selects a comment out of fixed phrases registered in advance in the user terminal 7.

Subsequently, the user terminal 7 transmits to the web server 3B, the comment generated by the user, and requests the registration of the comment. At this moment, it is necessary to verify the user at the web server 3B. Either the user ID or the community ID can be used as an ID for this verification. In a case that the web server 3B has a function of discriminating each card ID, the user ID may be specified in such a way that the web server 3B obtains the card ID inputted from the user terminal 7 and provides the card ID obtained to the game server 3A. The user verification may be implemented prior to the generation of comment at step S101.

When receiving a comment registration request from the user terminal 7, the web server 3B starts the comment registration processing for the server 3B. First, the web server 3B discriminates the content of the request transmitted from the user terminal 7, the content being the ID specifying the user and the content of comment (step S201). Subsequently, the web server 3B forwards to the game server 3A, the registration request from the user terminal 7 (step S202). In a case that the user verification in the web server 3B is implemented using the community ID, the user ID corresponding to the community ID is obtained from the ID management data 35, and the user ID obtained is transmitted as a part of the request to the game server 3A. The game server 3B which received the registration request from the web server 3B starts the comment registration processing of the game server 3A. First, the game server 3A discriminates the content of the request, specifically, the user ID and the content of comment (step S301). Subsequently, the game server 3A extracts the game-play data 34 correlated to the user ID, and registers the comment received from the web server 3B in the registered comment data of the game-play data 34 (step S302). After the registration, the game server 3A transmits a processing result to the web server 3B (step S303). The web server 3B receives the processing result from the game server 3A (step S203), and transmits the processing result to the user terminal 7 (step S203). The user terminal 7 receives the processing result from the web server 3B (step S103), and displays the processing result for the user (step S104). With that, the comment registration processing ends.

Figure 7:
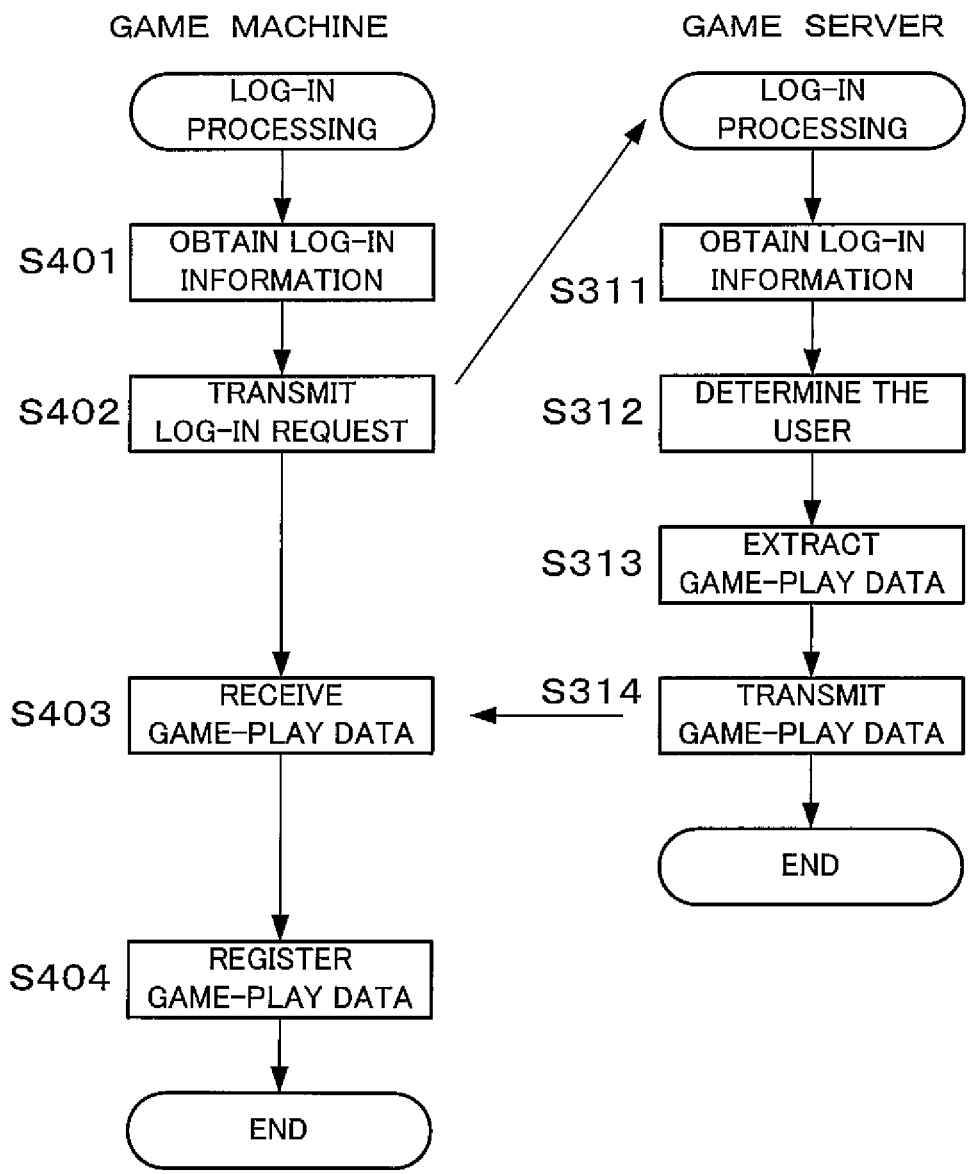
FIG. 7 is a flow chart showing procedure of log-in processing implemented when a user starts a game at a game machine.

FIG. 7 shows a log-in processing implemented at the moment when a user starts a game at the game machine 2. When the user indicates the start of the log-in processing to the game machine 2, the game machine 2 starts the log-in processing. First, the game machine 2 requests the user a read-out operation for a card 8, detects the read-out operation upon the request, and obtains information necessary for log-in (the log-in information) from the card 8 (step S401). The information necessary for log-in includes at least the card ID. Subsequently, the game machine 2 transmits the log-in information obtained to the game server 3A to request the log-in processing for the user (step S402). By receiving this, the game server 3A also starts the log-in processing. First, the game server 3A obtains the log-in information transmitted from the game machine 2 (step S311). Subsequently, the game server 3A refers to the ID management data 33 and determines the user ID corresponding to the card ID included in the log-in information (step S312). Next, the game server 3A extracts the game-play data 34 corresponding to the user ID. After that, the game server 3A transmits the game-play data 34 extracted to the game machine 2 which has transmitted the log-in request (step S314). The game machine 2 receives the game-play data 34 transmitted from the game server 3A, and registers the game-play data 34 in an internal storage device of the game machine 2 (step S404). With that, the log-in processing ends. By implementing the log-in processing, it is made possible that the user plays the game continuously from the last game-play at the game machine 2. Besides that, the comment registered for a reply by the user and the received comment data are also held in the game machine 2.

Next, referring to FIGS. 8 and 9, the processing for transmitting and receiving a comment at the user terminal 7 will be explained. FIG. 8 shows the processing implemented when a comment is transmitted and received at the user terminal 7. The processing shown in FIG. 8 is implemented for updating comment data in a state that the user has already logged in to the community service at the user terminal 7 and the community data 36 has been read into the user terminal 7. When the comment reception processing is started at the user terminal 7 by a predetermined trigger, the user terminal 7 requests the web server 3B to transmit the comment data (step S111). In this case, the user ID or the community ID of the user is also transmitted to the web server 3B from the user terminal 7. The comment reception processing implemented in the user terminal 7 may be started by taking a reception operation by the user as a trigger, or may be started automatically at a constant frequency by the community service processing portion 22. The former is a typical pull-based distribution where the reception is started based on some operation by the user, and the latter is also kind of the pull-based distribution, but it is possible to realize a pseudo push-based comment distribution by making the frequency of the reception processing short.

When receiving a comment data request from the user terminal 7, the web server 3B starts comment transmission processing. In the comment transmission processing, first, the web server 3B determines the community ID transmitted from the user terminal 7 (step S211). In a case that the user ID is transmitted from the user terminal 7, the community ID corresponding to the user ID is obtained from the ID management data 35. In a case that the community ID is transmitted from the user terminal 7, the transmitted ID is obtained as it is. Subsequently, the web server 3B extracts the community data corresponding to the community ID determined, and transmits the comment data included in the community data extracted to the user terminal 7 (step S212). In this case, the procedure may be set so that the comment data can be transmitted dividedly in such a way that the comment data included in a predetermined range from the latest comment is transmitted firstly, and when the user requests to transmit older comments, the comment data included in the next range is transmitted. The number of pieces, or the size of comment data to be transmitted at one time can be changed depending on the kind of the user terminal 7. For example, a function of discriminating the kind of the user terminal 7 is added to the web server 3B, and in a case that a PC has a comparative high processing ability thereof, the range of one time transmission is set to comparatively big, and in a case of a portable type terminal (a portable phone or a smart phone), the range for one time transmission may be set to comparatively small.

After transmitting the comment data, the web server 3B updates the status of the comment data to indicate that the comment transmitted to the user terminal 7 is in the read status, and adds a predetermined number of points to the community point of the user who received the comment (step S213). In this case, some limitation may be set such that the points are added only once a day. On the other hand, the user terminal 7 receives the comment data transmitted from the web server 3B (step S112). Then, the user terminal 7 exchanges the comment data existing in the user terminal 7 with the received comment data, and displays the comment browse image 100 (see FIG. 2) based on the received comment data (step S113). Thereby, the browse image 100 based on the latest comment data is displayed at the user terminal 7, and the user can browse an unread comment held in the web server 3B. With that, the processing necessary for receiving the comment at the user terminal 7 completes.

FIG. 9 shows processing implemented at the moment when the comment is transmitted at the user terminal 7. The processing shown in FIG. 9 is also implemented in a state that the user has already logged in to the community service at the user terminal 7 and the community data 36 has been read into the user terminal 7. Namely, the transmission and reception of comment at the user terminal 7 are implemented in a state that the user has logged in to the community service of the web server 3B with using the community ID.

When the comment transmission processing is started at the user terminal 7 by a predetermined trigger, the user terminal 7 makes the user select the receiver (step S111). The comment transmission processing at the user terminal 7 may be started by taking it as a trigger that the user selects from the browse image 100 a comment as an objective to be replied, or may be started by taking it as a trigger that the user performs a comment generation operation at the user terminal 7. In the former case, the receiver is a user who is a transmitter of the comment as the objective to be replied. In a case of the latter, the receiver is any one of the community IDs registered in the fellow data, in other word, the receiver is limited to any one of the other users registered by the user as fellows. Subsequently, the user terminal 7 obtains the content of comments (strings) to be transmitted from the user (step S122). In this case, the comment may be generated, like the case of registration of comment for reply, by making the user input given strings with using a function of inputting strings of the user terminal 7, or may be generated by selecting a comment out of fixed phrases registered in advance in the user terminal 7.

After obtaining the comment, the user terminal 7 transmits the comment to the web server 3B (step S123). The information transmitted includes, besides the comment text, the community ID of the receiver, the community ID of the transmitter, the information for discriminating the content of comment, and the like. As mentioned above, the information for discriminating the content of comment is the information for discriminating the kind, "encouragement", "celebration", or "return" the comment belongs to. The kind may be indicated by the user, or may be determined automatically by the user terminal 7. For example, the kind can be set in such a way that, in a case that the user selects the receiver by selecting one received comment in the browse image 100, "return" is selected automatically, and in a case that the user indicates to transmit a comment to displayed fellow news, which will be explained later, "celebration" is selected, and in the other case, "encouragement" is selected. When receiving the comment transmitted from the user terminal 7, the web server 3B starts comment reception processing. First, the web server 3B determines the community IDs of the receiver and the transmitter of the comment transmitted respectively (step S221). Subsequently, the web server 3B registers the received comment (including the kind and the like shown in FIGS. 4 and 5) in the comment data of the community data 36 of the receiver as a received comment, and in the comment data of the community data 36 of the transmitter as a transmitted comment (step S222). Next, the web server 3B adds a predetermined number of points to the community point of the community data 36 of the transmitter (step S223). In this case, some limitation may be also set such that the points are added only once a day. Further, in a case that the comment the user transmitted at step S 223 is a reply to a comment from the other user, the web server 3B updates the status of the comment as the objective to be replied so as to indicate the replied status. With that, the processing necessary for transmitting a comment completes.

Next, processing for receiving and transmitting a comment at the game machine 2 will be explained. FIG. 10 shows the processing at the moment when the user receives a comment at the game machine 2. This processing is implemented after the log-in processing shown in FIG. 7 is implemented. When comment reception processing is started by a predetermined trigger at the game machine 2, the game machine 2 requests the game server 3A to transmit the comment data (step S411). In this case, the card ID is transmitted as information for specifying the user to the game server 3A. In a case the game machine 2 obtains the user ID by the log-in processing, the user ID may be transmitted to the game server 3A. The comment reception processing of the game machine 2 may be started by taking the reception operation by the user as a trigger, or may be started automatically at a constant frequency by the community service processing portion 21. However, in a case that it is hard to perform the reception operation during the game-play at the game machine 2, it could be preferable that the game machine 2 starts the comment reception processing automatically at a constant frequency. Further, as the time of game-play of the game machine 2 is limited, it could be preferable that the frequency of the reception processing is made short to realize the pseudo push-based comment distribution.

When it is requested from the game machine 2 that the comment data is transmitted, the game server 3A starts comment forwarding processing. In the comment forwarding processing, the game server 3A determines the user ID of the user of the game machine 2 (step s321). In this case, when the card ID is transmitted from the game machine 2, the user ID is obtained corresponding to the card ID by referring to the ID management data 33. In a case that the user ID is transmitted from the game machine 2, the user ID transmitted is obtained. Subsequently, the game server 3A requests the web server 3B to transmit the comment data (step S322). This request includes the user ID. Upon the request from the game server 3A, the web server 3B starts comment transmission processing. The comment transmission processing is the same as the comment transmission processing of the web server 3B shown in FIG. 8. Namely, from the game server 3A, the user ID is indicated and requested is the transmission of the community data 36 corresponding to the user ID indicated. Then, the web server 3B obtains the community ID corresponding to the user ID from the ID management data 35 (step S211), and transmits the community data 36 corresponding to the community ID to the requester, in this case the game server 3A (step S212), and with respect to the community data 36 transmitted, the web server 3B updates the status and increases the community point (step S213).

The game server 3A receives the comment data (step S323) and transmits the comment data to the game machine 2 (step S324). The game machine 2 receives the comment data from the game server 3A (step S412). Next, the game machine 2 selects a new arrival comment by comparing the received comment included in the comment data received to the received comment in the game-play data 34 held in the game machine 2, and registers the new arrival comment as the received comment data in the game-play data 34 (step S413). The new arrival comment is the received comment, the reception date of which is newer than the reception date of the latest received comment held in the game-play data 34, and the status of which indicates the unread status. The status is limited only to the unread status, because the received comment which has been already browsed at the user terminal 7 could exist, even if the received comment does not exist in the game-play data 34. In a case that, because of recoding the new arrival comment, the number of pieces of received comment data held in the game-play data 34 exceeds the limit thereof, the necessary number of pieces of received comment data which has been already registered are deleted. In a case that, because of the new arrival comment itself, the number of pieces of received comment data exceeds the limit, the latest comment is prioritized. Any old comment exceeding the limit is not registered in the game-play data 34 even if the comment is the new arrival comment. With registering the new arrival comment, the various kinds of information included in the data of new arrival comment such as the kind and the transmitter information are also registered.

Next, the game machine 2 displays the registered new arrival comment in the comment window 111 of the game image 110 (step S414). In a case that plural new arrival comments exist, the latest one is displayed in the window 111 (see FIG. 2). The game machine 2 starts comment reply processing (step S415). With that, processing necessary for receiving the comment at the game machine 2 completes. In the above embodiment, though the selection and the registration of the new arrival comment are implemented at the game machine 2, as the game-play date 34 also exists in the game server 3A, the selection and the registration of the new arrival comment may be implemented at the game server 3A. Then, after the game-play data 34 being updated, the received comment data may be transmitted to the game machine 2.

Figure 11:
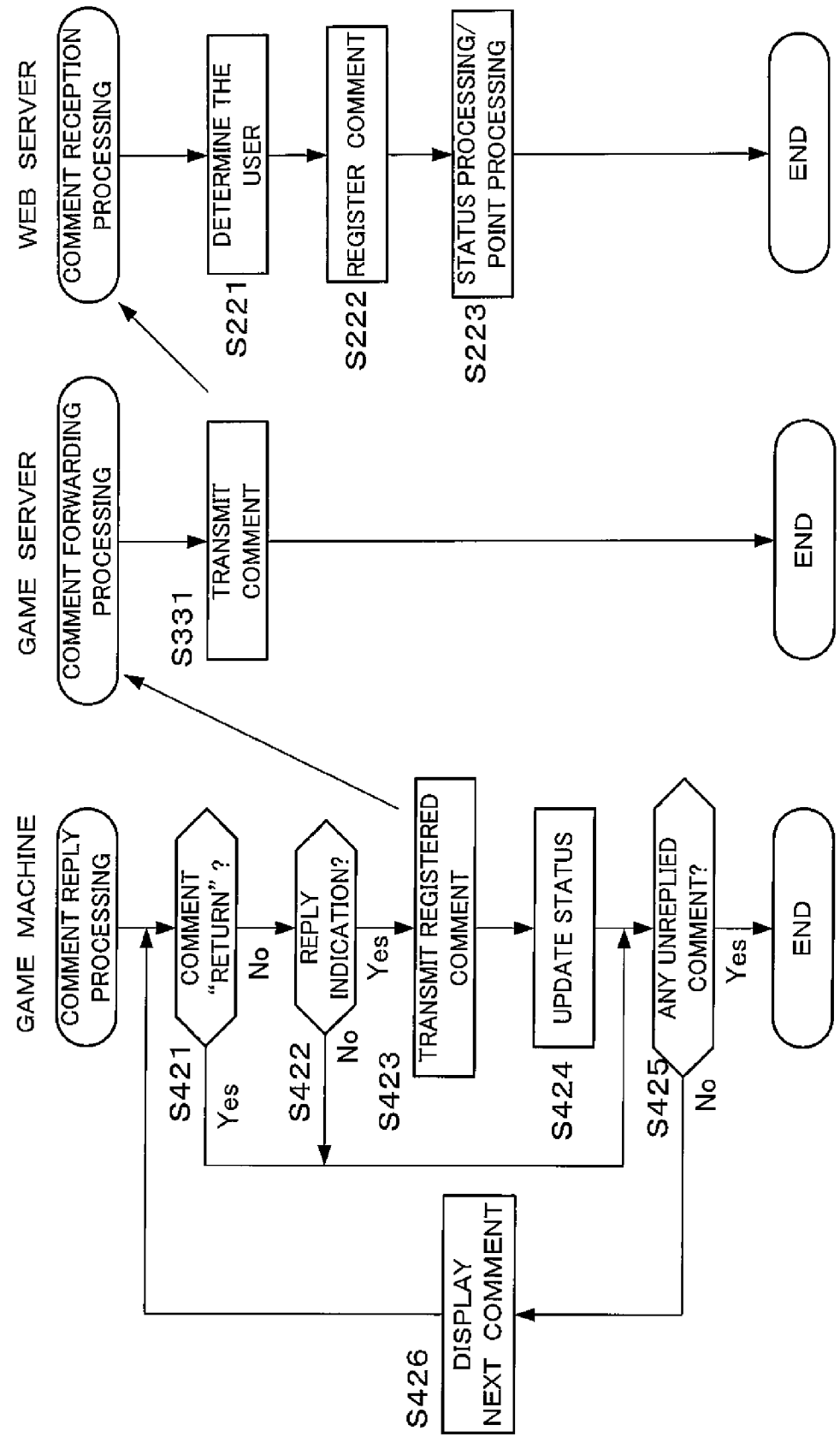
FIG. 11 is a flow chart showing procedure of processing implemented so that a user transmits a comment at a game machine.

FIG. 11 shows processing implemented at the moment when the user transmits a comment from the game machine 2. At the game machine 2, the comment reply processing starts by taking the step S415 of FIG. 10 as a trigger. In the comment reply processing, first, the game machine 2 determines whether or not the comment displayed in the window 111 (the latest received comment in the first case) is a comment of "return", based on the kind of the received comment (step S421). If the kind of the comment is not "return", the game machine 2 determines whether or not the user indicated a reply (step S422). As explained in FIG. 2, the reply is indicated by the touch operation to the window 111. In a case that the reply is indicated, the game machine 2 transmits to the game server 3A, transmission comment data, the comment text of which is the registered comment held in the game-play data 34 (step S423). At this moment, the user ID of the transmitter of the registered comment and the community ID of the user as the receiver of the comment are also transmitted by being included in the transmission comment data. It is possible to determine the community ID from the transmitter information (see FIG. 4) included in the data of new arrival comment displayed in the window 111.

In addition, in a case that it is allowed to register plural registered comments in the game-play data 34, necessary is a process of selecting one registered comment as an objective to be transmitted. For example, the selection process may be implemented by displaying a list of registered comments and making the user select one of the registered comments. Alternatively, not depending on an indication by the user, the game machine 2 may select any one of registered comments, according to a predetermined procedure. For example, the following embodiment can be considered. At the moment when each registered comment is registered, selection information is set to each registered comment. The game machine 2 selects one appropriate registered comment, referring to the selection information. As the selection information, for example, the kind ("encouragement" or "celebration") of the comment which is the objective to be replied, appropriate date and time for the selection, and the like can be set depending on the situation. The registered comment can be selected by the combination of the indication by the user and the selection control by the game machine 2.

After implementing step S423, the game machine 2 updates the game-play data 34 so that the status of the received comment indicates the replied status (step S424), the received comment corresponding to the comment to which the user indicated the reply, that is, the comment being displayed in the window 111. Subsequently, it is determined whether or not the display of all unreplied comments held in the game-play data 34 is completed (step S425). By the way, when an affirmative determination is obtained in step S421, or a negative determination is obtained in step S422, the game machine 2 goes to the process of step S425. When it is determined that an unreplied comment still remains at step S425, the game machine 2 displays the next unreplied comment in the window 111 (step S426), and after that, goes back to step S421.

When receiving the data of registered comment transmitted from the game machine 2, the game server 3A starts comment forwarding processing, and transmits the comment data received from the game machine 2 to the web server 3B (step S331). The web server 3B which has received this comment data implements a similar processing to the comment reception processing shown in FIG. 9. Namely, the web server 3B obtains from the ID management data 35, the community ID corresponding to transmitter's user ID included in the comment data forwarded from the game server 3A, and obtains receiver's community ID included in the comment data (step S221). Subsequently, the web server 3B registers the comment data received, as the data of received comment, in the comment data of the community data 36 of the receiver, and registers the comment data received, as the data of transmitted comment, in the comment data of the transmitter's community data 36 (step S222). Next, the web server 3B adds a predetermined number of points to the community point in the community data 36 of the transmitter (step S223). In this case, some limitation may be also set such that the points are added only once a day. Further, at step S223, in a case that the comment transmitted from the user is a reply to the comment from the other user, the web server 3B updates the status of the comment which is the objective to be replied so as to indicate the replied status. With that, the processing necessary for transmitting a comment from the game machine completes.

In the processing shown in FIGS. 10 and 11, though the game server 3A intervenes between the game machine 2 and the web server 3B, the game server 3A can be omitted. In this case, the procedure can be changed so that the game machine 2 accesses the web server 3B directly to transmit and receive the comment.

Figure 12:
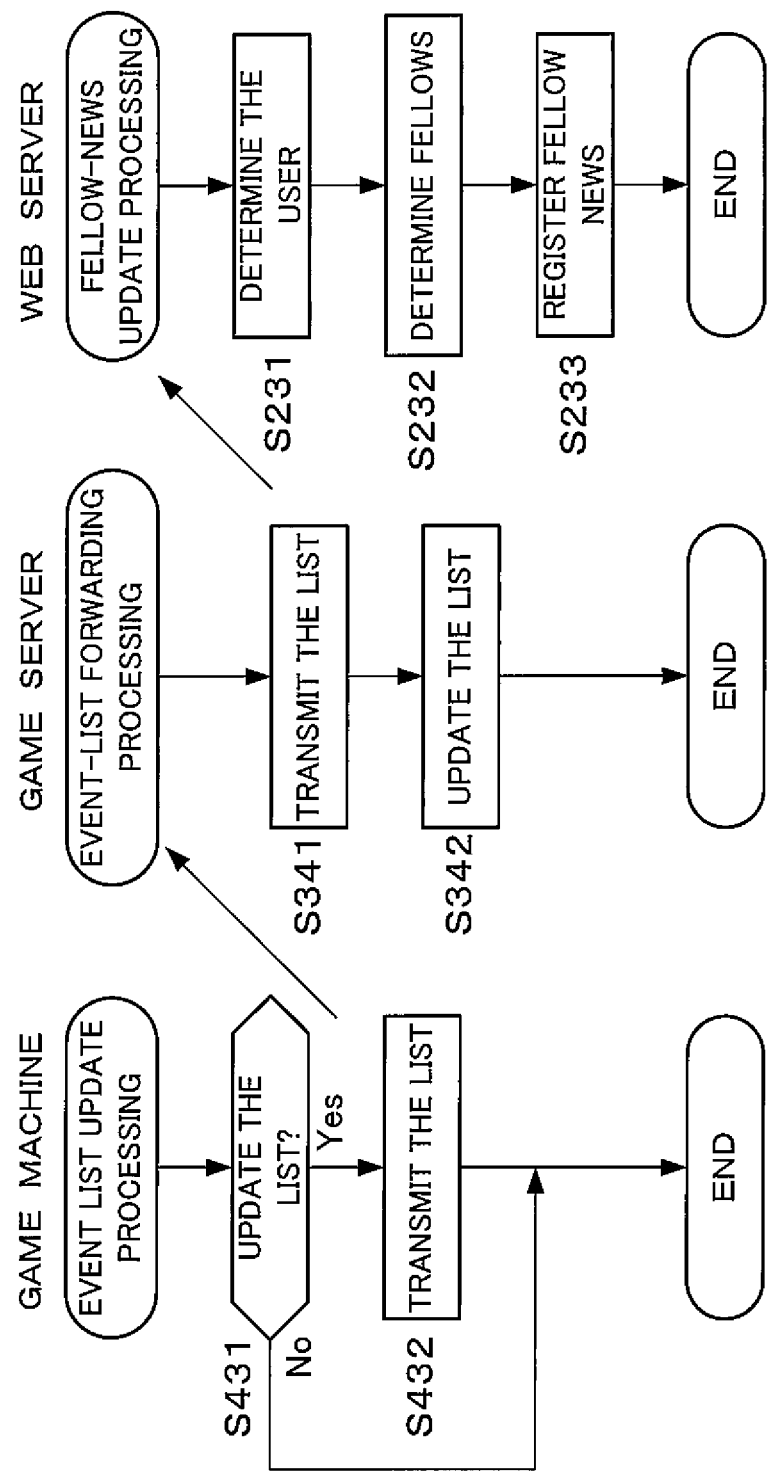
FIG. 12 is a flow chart showing procedure of processing implemented for updating fellow news.

Next, referring to FIGS. 12 to 14, the processing relating to the distribution of the fellow news will be described. FIG. 12 shows processing implemented by the web server 3B for updating the fellow news (news information) of the community data 36. The game machine 2 implements event-list update processing at a constant frequency. In this processing, the game machine 2 first determines whether or not the event list in the game-play data 34 held by the game machine 2 has been updated (step S431). In a case of not updated, the game machine 2 ends the processing for the event list of this time. On the other hand, in a case of updated, the game machine 2 transmits the event list updated to the game server 3A with the user ID held in the game-play data 34 (step S432). Upon this transmission, the game server 3A transmits the event list transmitted to the web server 3B with the user ID (step S341). Subsequently, the game server 3A updates the event list of the game-play data 34 corresponding to the user ID obtained from the game machine 2 by the event list obtained newly (step S342).

Upon the transmission of the event list, the web server 3B starts fellow-news update processing. In this processing, the web server 3B obtains from the ID management data 35, the community ID corresponding to the user ID received from the game server 3A (step S231). Subsequently, the web server 3B determines, referring to the community data 36 corresponding to the community ID, the community IDs of the fellow data correlated to the community ID (step S232). Further, the web server 3B extracts all pieces of community data 36 correlated to the community IDs of the fellow data determined, and updates the fellow news included in the extracted pieces of community data 36 based on the event list transmitted from the game server 3A (step S233). In this case, the occurrence date and time and the text data included in the event list, and the community ID and the nickname correlated to the user ID of the event list are registered in the fellow news. With that, each time the event list is updated, the fellow news of the community data 36 is updated.

Also in the processing shown in FIG. 12, the procedure may be changed so that the game machine 2 accesses the web server 3B directly and transmits the event list directly to the web server 3B. In this case, the event list of the game-play data 34 held by the game server 3A is not updated. However, as the whole of game-play data 34 is transmitted at an appropriate timing (for example, the end of a single game) to the game server 3A from the game machine 2 and is updated appropriately, no big problem occurs.

Figure 13:
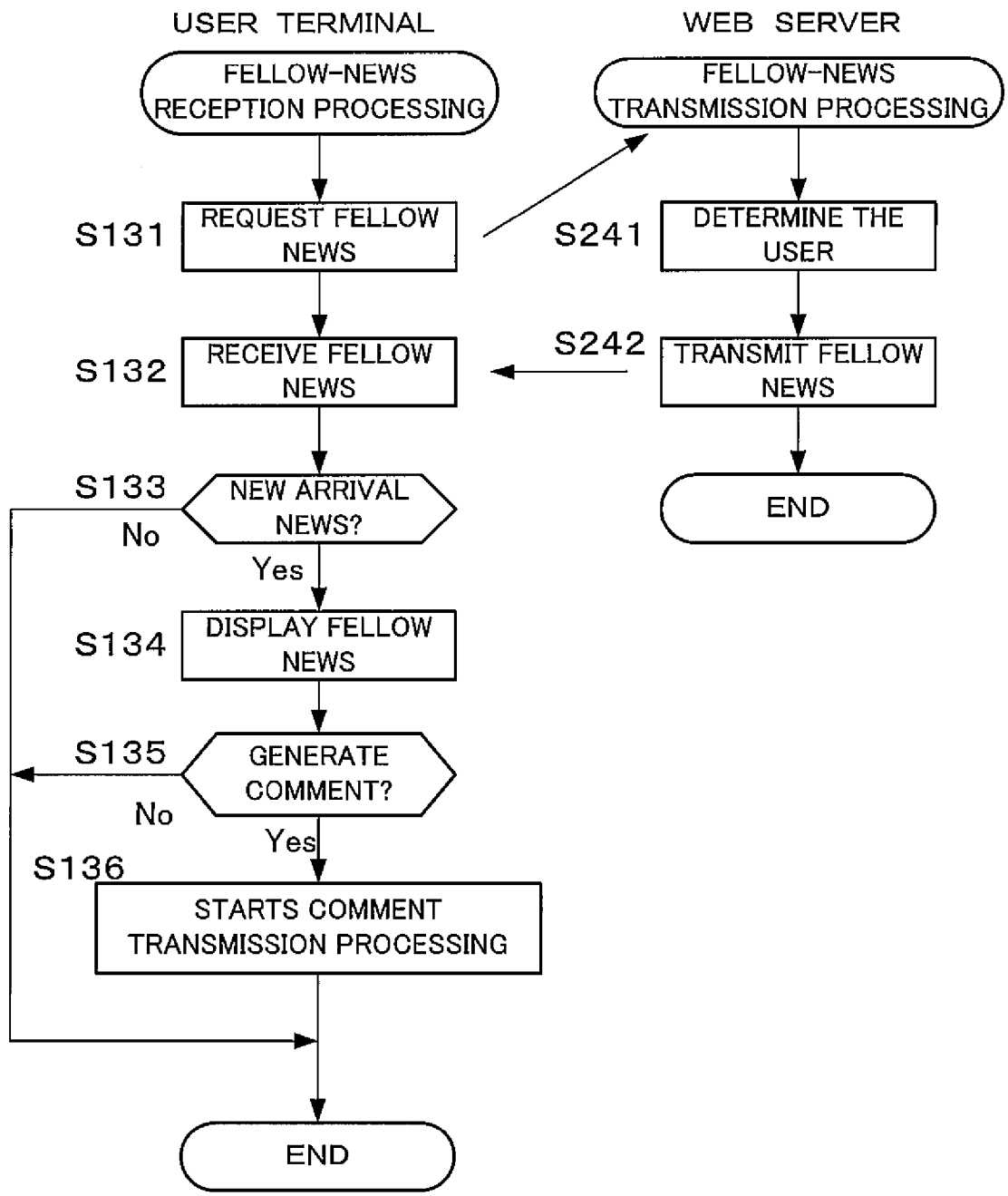
FIG. 13 is a flow chart showing procedure of processing implemented for receiving the fellow news at a user terminal.
Figure 14:
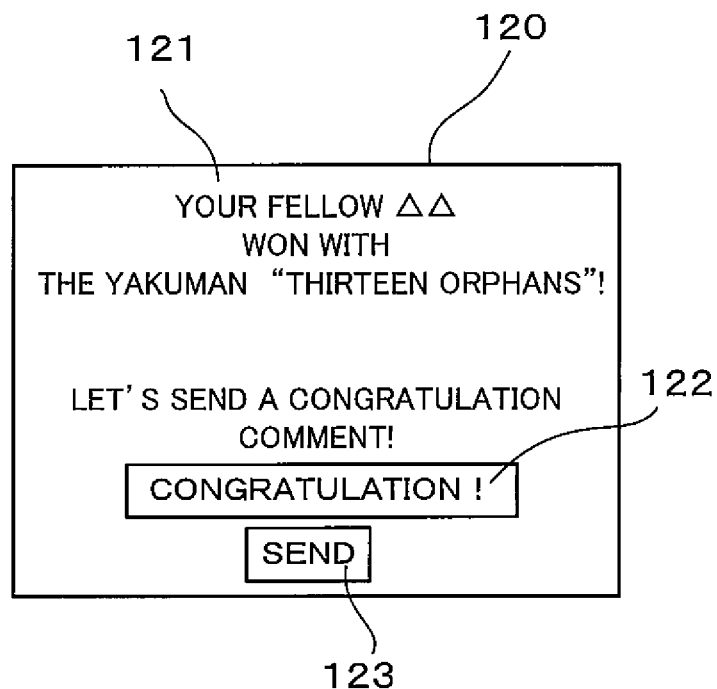
FIG. 14 is a diagram showing one example of image for displaying the fellow news.

FIG. 13 shows processing for receiving the fellow news at the user terminal 7. The processing shown in FIG. 13 is implemented for updating the fellow news in a state that the user has logged in to the community service at the user terminal 7 and the community data 36 has been read into the user terminal 7. When the fellow-news reception processing starts at the user terminal 7 by a predetermined trigger, the user terminal 7 requests the web server 3B to transmit the fellow news (step S131). In this case, the user ID or the community ID of the user is also transmitted to the web server 3B from the user terminal 7. The fellow-news reception processing at the user terminal 7 may be started by taking a reception operation by the user as a trigger, or may be started automatically at a constant frequency by the community service management portion 22. The former is the typical pull-based distribution that reception is started based on an operation by the user. The latter is also kind of the pull-based distribution, but by making the frequency of the reception processing short, it is possible to realize a pseudo push-based comment distribution.

When receiving the fellow news request from the user terminal 7, the web server 3B starts fellow-news transmission processing. In the fellow-news transmission processing, the web server 3B determines the community ID transmitted from the user terminal 7 (step S241). In a case that the user ID was transmitted from the user terminal 7, the community ID corresponding to the user ID is obtained from the ID management data 35. In a case that the community ID was transmitted from the user terminal 7, the community ID transmitted is obtained as it is. Subsequently, the web server 3B extracts the community data 36 corresponding to the community ID determined, and transmits the fellow news included in the extracted community data to the user terminal 7 (step S242).

The user terminal 7 receives the fellow news transmitted from the web server 3B (step S132). Then, the user terminal 7 determines, referring to the occurrence date and time registered in the fellow news, whether or not new arrival news exists (step S133). In this case, as the community data 36 has been already held in the user terminal 7, it is possible to determine whether or not the fellow news is new arrival news by comparing the occurrence date and time of the fellow news registered in the community data 36 to the occurrence date and time of the fellow news obtained newly. In a case that no new arrival news exists, the game machine 2 ends the fellow-news reception processing of this time. In a case that the new arrival news exits, the user terminal 7 displays the new arrival fellow news on the display device of the user terminal 7 (step S134). FIG. 14 shows one example of image where the fellow news is displayed. The news image 120 of this case includes a news display area 121 where the content of fellow news is displayed as text data, a text box 122 where the user can input his/her comment for "celebration", and a transmission instruction button 123.

Returning to FIG. 13, after displaying the news image 120, the user terminal 7 determines whether the user has selected the generation of celebration comment (step S135). For example, in a case that the user selects the text box 122 on the news image 120 within a predetermined time after displaying the news image 120, and the user starts inputting his/her celebration comment or the user doesn't perform a predetermined cancel operation, it is determined that the generation of celebration comment has been selected. In a case that the generation of celebration comment has been selected, the user terminal 7 starts comment transmission processing (step S136). With that, the processing relating to the distribution of fellow news completes.

The comment transmission processing, which is started by taking step S136 in FIG. 13 as a trigger, is similar to the comment transmission processing shown in FIG. 9. However, in this case, at step S122, the community ID of the transmitter of the fellow news, that is, the user determined at step 231 shown in FIG. 12, is selected as the receiver, and at step S122, the comment inputted in the text box 122 is obtained. Further, at step S123, "celebration" is set as the kind of comment to be transmitted.

In the above example, when the user obtains a predetermined result at the game machine 2, the fellow news is distributed. However, the news distribution is not limited to this case. For example, news information may be distributed when the user reaches certain kinds of status in the game of the game system 2. For example, when the status (a level, a rank, or the like) of user rises, news information may be distributed, or, also when the user is demoted, or the user is put in a pinch, or the like, news information may be distributed. In this case, the system may be configured so that the user can reply his/her encouragement comment.

As explained above, in the amusement system 1, it is possible to communicate a comment even between the game machine 2 and the user terminal 7. Accordingly, it is possible to expand the scene and the opportunity of communication between users, and by raising the feeling that users are linked to each other though the communication, it is possible to enhance the attractiveness of amusement system and further, enhance the attractiveness of game machine itself. As the reply is implemented at the game machine 2 by replying a comment for reply which is registered in advance, it is possible to suppress unpleasantness such that the game-play is interrupted because of transmitting the reply. Further, by distributing the fellow news, interest in a game of users who are not playing the game is raised, and it is possible to give to such users, a motivation of playing a game at the game machine.

In the mentioned embodiment, the community service processing portion 22 of the user terminal 7 functions as the comment transmission device of the terminal apparatus by implementing the processes of steps S121 to S123 shown in FIG. 9, and functions as a comment reception device of the terminal apparatus by implementing the processes of steps S111 to S113 shown in FIG. 8. The community service management portion 12 provided in the web server 3B functions as a comment data registration device of the server apparatus by implementing the processes of steps S221 and S222 shown in FIG. 9, and functions as a comment distribution device to the terminal apparatus by implementing the processes of steps S211 and S212 shown in FIG. 8. The community service management portion 11 of the game server 3A and the community service management portion 11 of the web server 3B functions as a comment distribution device to the game machine by implementing the processes of steps S321 to S324 and the processes of steps S211 to S212 shown in FIG. 10 respectively. Further, the community service processing portion 21 of the game machine 2 functions as the comment reception device of the game machine by implementing the processes of steps S412 to S414 shown in FIG. 10, and functions as the reply request device by implementing the processes of steps S421 to S426 shown in FIG. 11.

The community service management portion 21 of the game machine 2 functions as the comment for reply registration request by implementing the processes of steps S101 to S102 shown in FIG. 6. The community service management portion 11 of the game server 3A functions as the comment for reply registration device by implementing the processes of steps S301 and S302 shown in FIG. 6. Further, the game server 3A functions as the comment for reply transmission device by implementing the processes of steps S311 to S314 shown in FIG. 7. The community service processing portion 21 of the game machine 2 functions as the news information transmission device by implementing the processes of steps S431 and S432 shown in FIG. 12. The community service management portion 12 of the web server 3B functions as the news information distribution device by implementing the processes of steps S231 to S233 shown in FIG. 12 and the processes of steps S241 to S242 shown in FIG. 13. The community service processing portion 22 of the user terminal 7 functions as the news information reception device by implementing the processes of steps S132 to S134 shown in FIG. 13, and functions as the comment transmission device for the news information by implementing the process of step S136 shown in FIG. 13 and by implementing, using the process of step S136 as a trigger, the processes of steps S221 to S223 shown in FIG. 11

The present invention is not limited to the above mentioned embodiment and can be applied to various kinds of variations. For example, in the above embodiment, the transmitted comment and the received comment of each user are registered in the comment data of the storage device 32 for the web server. However, only the received comment may be registered in the comment data by holding the transmitted comment in the terminal apparatus of a user. In the above example, the present invention is explained with using the pull-based distribution or the pseudo push-based distribution such that the comment which a user should receive is registered in the comment data of a server side first, and the terminal apparatus and the game machine refers to the comment in an appropriate timing. However, it is possible to configure a system as the push-based distribution. The configuration of the server apparatuses is only one example, and it is not necessary for the present invention to configure server functions by separating the game server for the game machine from the web server for the terminal apparatus. It is natural that the game machine can access the web server directly to receive the community service. Further, the data structures are only one example. The game-play data and the community data can be integrated, or it is also possible to further divide the both data into some pieces and associate the divided pieces of data with each other.

What is claimed is:

1. An amusement system including a game machine for commercial use configured to allow a user to play a game in exchange of payment of game-play fee by the user, a personal terminal apparatus configured to allow a user to input given strings and a server apparatus configured to provide a predetermined service associated with the game to the game machine, and the personal terminal apparatus, the game machine, the terminal apparatus and the server apparatus communicating with each other via a network with specifying the other side of communication, the server apparatus configured to specify a user of each of the game machine and the personal terminal apparatus by exchanging information necessary for specifying the user with each of the personal terminal apparatus and the game machine, wherein the server apparatus is connected to a storage device for server storing comment data for each user, where a comment which the user transmitted with specifying another user as a receiver is registered with information necessary for specifying the user as a transmitter of the comment, the personal terminal apparatus has:

a comment transmission device adapted and configured to transmit a comment inputted by a user of the personal terminal apparatus to the server apparatus with information necessary for specifying a user as a receiver of the comment; and a comment reception device adapted and configured to receive from the server apparatus and present to the user of the personal terminal apparatus, the comment in the comment data registered in the storage device for server in association with the user of the personal terminal apparatus, the server apparatus has:

a comment data registration device adapted and configured to specify the user as the receiver of the comment transmitted from the personal terminal apparatus, and register the comment in the comment data correlated to the user as the receiver with information necessary for specifying the user as the transmitter; and a comment distribution device adapted and configured to transmit the comment to be transmitted to the user as the receiver within comments registered in the comment data, to the personal terminal apparatus of the user as the receiver of the comment with the information necessary for specifying the user as the transmitter of the comment, the storage device for server having a comment for reply set by a user in advance in association with information necessary for specifying the user, the comment distribution device of the server apparatus adapted and configured to, in a case that a user accesses the server apparatus from the game machine, transmit the comment to be transmitted to the user within the comments registered in the comment data in association with the user, to the game machine of the user with the information necessary for specifying the user as the transmitter of the comment, the game machine has:

a comment reception device adapted and configured to receive and present to the user, the comment transmitted from the server apparatus, the receiver of which is the user of the game machine; and a reply request device adapted and configured to, based on an instruction by the user, request the server apparatus, with indicating as a receiver the transmitter of the comment presented at the game machine, to transmit as a reply comment, a comment for reply correlated to the user of the game machine to the user as the receiver, and the comment data registration device of the server apparatus adapted and configured to, by following a reply request from the game machine, register the comment for reply in the comment data correlated to the user as the receiver so as to set the transmitter of the comment is the user of the game machine.

2. The amusement system according to claim 1, wherein

The personal terminal apparatus is provided with a comment for reply registration request device which is adapted and configured to transmit to the server apparatus, a request for registering strings indicated by the user as the comment for reply, and the server apparatus is provided with a comment for reply registration device which is adapted and configured to register in the storage device for server the strings indicated by the user as the comment for reply which should be correlated to the user, by following the request for registering the comment for reply from the personal terminal apparatus.

3. The amusement system according to claim 2, wherein the comment for reply registration request device of the personal terminal apparatus is adapted and configured to request the server apparatus to register the strings inputted as the comment for reply at the personal terminal apparatus by the user, as the comment for reply corresponding to the user, and the comment for reply registration device of the server apparatus is adapted and engaged to register in the storage device for server, the strings inputted by the user at the personal terminal apparatus as the comment for reply, as the comment for reply which should be correlated to the user.

4. The amusement system according to any one of claims 1 to 3, wherein the server apparatus is provided with a comment for reply transmission device which is adapted and configured to transmit to the game machine when a user uses the game machine, the comment for reply registered in association with the user, and the game machine is provided with a comment for reply registration device which is adapted and configured to register the comment for reply transmitted from the server apparatus during a duration the game machine is used by the user, and the replay request device of the game machine is adapted and engaged to transmit to the server apparatus the comment for reply registered by the comment for reply registration device, when requesting the server apparatus to transmit the reply comment to the user as the receiver.

5. The amusement system according to any one of claims 1 to 3, wherein the game machine further comprises a pieces control device adapted and configured to control the number of pieces of comments which can be presented to the user of the game machine, so that the number is within a fixed range from the latest comment.

6. The amusement system according to any one of claims 1 to 3, wherein the storage device for server stores group information necessary for specifying a group of each user, the game machine is provided with a news information transmission device which is adapted and engaged to transmit, when the user reaches a predetermined status in the game, news information for informing the server apparatus of the status, the server apparatus is provided with a news information distribution device which is adapted and configured to, in a case that the news information is transmitted from the game machine, determine based on the group information, users who belong to the same group as the user who reached the predetermined status, and the personal terminal apparatus is provided with a news information reception device which is adapted and configured to receive and present to the user the news information.

7. The amusement system according to claim 6, wherein the comment transmission device of the personal terminal apparatus is adapted and configured to transmit to the server apparatus the strings inputted by the user in response to the news information presented, as a comment the receiver of which is the user who reached the predetermined status.

8. The amusement system according to claim 4, wherein the game machine further comprises a pieces control device adapted and configured to control the number of pieces of comments which can be presented to the user of the game machine, so that the number is within a fixed range from the latest comment.

9. The amusement system according to claim 4, wherein the storage device for server stores group information necessary for specifying a group of each user, the game machine is provided with a news information transmission device which is adapted and engaged to transmit, when the user reaches a predetermined status in the game, news information for informing the server apparatus of the status, the server apparatus is provided with a news information distribution device which is adapted and configured to, in a case that the news information is transmitted from the game machine, determine based on the group information, users who belong to the same group as the user who reached the predetermined status, and the personal terminal apparatus is provided with a news information reception device which is adapted and configured to receive and present to the user the news information.

10. The amusement system according to claim 5, wherein the storage device for server stores group information necessary for specifying a group of each user, the game machine is provided with a news information transmission device which is adapted and engaged to transmit, when the user reaches a predetermined status in the game, news information for informing the server apparatus of the status, the server apparatus is provided with a news information distribution device which is adapted and configured to, in a case that the news information is transmitted from the game machine, determine based on the group information, users who belong to the same group as the user who reached the predetermined status, and the personal terminal apparatus is provided with a news information reception device which is adapted and configured to receive and present to the user the news information.

11. The amusement system according to claim 8, wherein the storage device for server stores group information necessary for specifying a group of each user, the game machine is provided with a news information transmission device which is adapted and engaged to transmit, when the user reaches a predetermined status in the game, news information for informing the server apparatus of the status, the server apparatus is provided with a news information distribution device which is adapted and configured to, in a case that the news information is transmitted from the game machine, determine based on the group information, users who belong to the same group as the user who reached the predetermined status, and the personal terminal apparatus is provided with a news information reception device which is adapted and configured to receive and present to the user the news information.

12. The amusement system according to claim 9, wherein the comment transmission device of the personal terminal apparatus is adapted and configured to transmit to the server apparatus the strings inputted by the user in response to the news information presented, as a comment the receiver of which is the user who reached the predetermined status.

13. The amusement system according to claim 10, wherein the comment transmission device of the personal terminal apparatus is adapted and configured to transmit to the server apparatus the strings inputted by the user in response to the news information presented, as a comment the receiver of which is the user who reached the predetermined status.

14. The amusement system according to claim 11, wherein the comment transmission device of the personal terminal apparatus is adapted and configured to transmit to the server apparatus the strings inputted by the user in response to the news information presented, as a comment the receiver of which is the user who reached the predetermined status.

* * * * *